United States Patent [19]
Tajiri

[11] Patent Number: 5,878,184
[45] Date of Patent: *Mar. 2, 1999

[54] DEVICE AND METHOD FOR DATA PLAYBACK USING INTERPOLATION ADDRESS SIGNAL

[75] Inventor: Takashi Tajiri, Saitama, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 834,827

[22] Filed: Apr. 9, 1997

Related U.S. Application Data

[63] Continuation of Ser. No. 541,731, Oct. 10, 1995, abandoned.

[30] Foreign Application Priority Data

Oct. 11, 1994 [JP] Japan .................................. 06-271780

[51] Int. Cl.⁶ ...................................................... H04N 5/85
[52] U.S. Cl. ................................ 386/126; 360/32; 369/54
[58] Field of Search ........................ 369/54, 58; 386/126, 386/125, 45; 360/32; H04N 5/85

[56] References Cited

U.S. PATENT DOCUMENTS

| | | | |
|---|---|---|---|
| 4,669,000 | 5/1987 | Odaka et al. ............................... | 360/32 |
| 4,788,685 | 11/1988 | Sako et al. ................................ | 371/38 |
| 4,839,878 | 6/1989 | Inoue ........................................ | 369/54 |
| 4,931,885 | 6/1990 | Mester et al. ............................. | 360/48 |
| 5,054,017 | 10/1991 | Hiroyoshi et al. ..................... | 369/275.3 |
| 5,241,521 | 8/1993 | Shigemori ................................. | 369/32 |
| 5,264,970 | 11/1993 | Tsia et al. ................................. | 360/53 |
| 5,270,998 | 12/1993 | Uchiumi ................................... | 369/277 |
| 5,276,667 | 1/1994 | Tsutsui et al. ............................. | 369/59 |
| 5,343,453 | 8/1994 | Ogino ..................................... | 369/44.28 |
| 5,353,175 | 10/1994 | Chiba ....................................... | 360/51 |
| 5,359,584 | 10/1994 | Fukushima et al. ...................... | 369/58 |
| 5,392,265 | 2/1995 | Takezawa ................................. | 369/32 |
| 5,469,417 | 11/1995 | Tanoue et al. ............................ | 369/50 |
| 5,475,668 | 12/1995 | Azumatani et al. ...................... | 369/58 |
| 5,497,364 | 3/1996 | Ichikawa et al. ......................... | 369/58 |
| 5,499,224 | 3/1996 | Sanada .................................... | 369/48 |
| 5,517,484 | 5/1996 | Takagi et al. .......................... | 369/275.3 |

FOREIGN PATENT DOCUMENTS

A-37 18 566  12/1988  Germany .

OTHER PUBLICATIONS

Patent Abstracts of Japan. vol 13. No. 590 (P–984). 26 Dec. 1989 & JP–A–01 251222 (NEC Eng., Ltd.), 6 Oct. 1989.

Patent Abstracts of Japan. vol. 8, No. 137 (P–282). 26 Jun. 1984 & JP–A–59 036385 (Matsushita Denki Sangyo K.K.), 28 Feb. 1984.

*Primary Examiner*—Tommy P. Chin
*Assistant Examiner*—Y. Lee
*Attorney, Agent, or Firm*—Frommer Lawrence & Haug LLP; William S. Frommer

[57] ABSTRACT

A sector address is obtained even when a playback signal is missed by incrementing the number of interpolations n when determined that error correction of read-out data is not possible, and incrementing and storing in a buffer "address" the contents of a work area B when the number of interpolations n is less than a preset value "Max". When the interpolation address calculation process has been repeated the prescribed number of times "Max" an emergency process is carried out.

6 Claims, 6 Drawing Sheets

FIG. 4 (PRIOR ART)
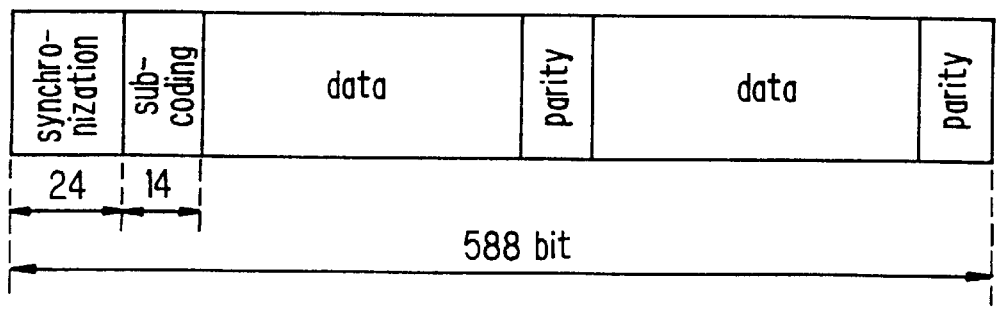
FIG. 5A (PRIOR ART)
| frame | sub-coding |
|---|---|
| 98n+1 | synchronization pattern |
| 98n+2 | synchronization pattern |
| 98n+3 | $P_1$ $Q_1$ $R_1$ $S_1$ $T_1$ $U_1$ $V_1$ $W_1$ |
| 98n+4 | $P_2$ $Q_2$ $R_2$ $S_2$ $T_2$ $U_2$ $V_2$ $W_2$ |
| ⋮ | ⋮ |
| 98n+97 | $P_{95}$ $Q_{95}$ $R_{95}$ $S_{95}$ $T_{95}$ $U_{95}$ $V_{95}$ $W_{95}$ |
| 98n+98 | $P_{96}$ $Q_{96}$ $R_{96}$ $S_{96}$ $T_{96}$ $U_{96}$ $V_{96}$ $W_{96}$ |
| $98(n+1)+1$ | |
FIG. 5B (PRIOR ART)
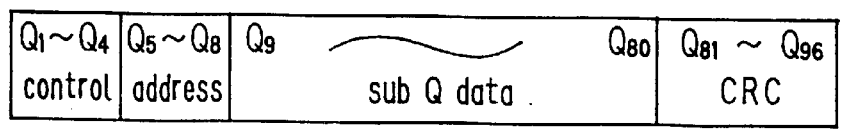

FIG. 7
(PRIOR ART)

Sector Header Layout

| Pos | ÷0 | ÷1 | ÷2 | ÷3 | Size |
|---|---|---|---|---|---|
| 4 | CRC | | | | 4 |
| 8 | Addr0 | Reserved | Layer | Copyright | 4 |
| 12 | Track Number | Index Number | Addr1 | Reserved | 4 |
| 16 | Time Code | | | | 4 |
| 20 | Application Code | Application Data | | | 12 |
| 32 | | | | | 4 |

Total: 32

DEVICE AND METHOD FOR DATA PLAYBACK USING INTERPOLATION ADDRESS SIGNAL

This application is a continuation of application Ser. No. 08/541,731, filed on Oct. 10, 1995, now abandoned.

BACKGROUND OF THE INVENTION

1. Field of the Invention

The present invention relates to an interpolation address generating method and interpolation address generating device for a recording medium recorded with addresses completing single frames.

2. Description of Related Art

Compact Disc (hereinafter referred to as "CD") data recording formats for, for example, Digital Audio Compact Discs (hereinafter referred to as "CD-DA") or video CD's etc. are constructed so that a single frame becomes the minimum unit, with 98 frames constituting a single block, as shown in FIG. 4.

One frame is constructed from 588 bits, with the leading 24 bits being provided for synchronization data, the following 14 bits being provided for a sub-code data area, and the subsequent bits being provided for data and parity.

With frames of this structure, a single block is constructed from 98 frames and sub-code data is gathered from the 98 frames to form the kind of single block sub-code data shown in FIG. 5(a).

The sub-codes taken for the leading first and second frames, i.e. frame 98n+1 and frame 98+2, of the 98 frames are taken to be the synchronization pattern. Each item of 96 bit channel data, i.e. the sub-codes for P, Q, R, S, T, U, V and W, is formed using the third frame through the 98th frame i.e. frame, 98n+3 through frame 98n+98.

Of these, the channels P and Q are used for controlling accesses. More specifically, channel P only indicates the pause portion between tracks, with finer control being carried out by the channel Q, i.e. Q1 to Q96. The 96 bits of Q channel data are structured in the way shown in FIG. 5(b).

First, the bits Q1 to Q4 are taken for control data and are used for audio data channel numbers, emphasis and CD-ROM identification etc.

The bits Q5 to Q8 are then taken as an address to be used as the sub-Q data control bits. If the value for these four bits is "0001", this indicates that the sub-Q data for the following bits Q9 to Q80 is audio Q data. A value of "0100" indicates that the sub-Q data for the following bits Q9 to Q80 is video Q data.

The bits Q9 to Q80 are regarded as 72 bit sub-Q data, with the remaining Q81 to Q96 being a Cyclic Redundancy Code (hereinafter referred to as CRC) which is used for determining the validity of the received Q-channel data so that only correct data is read-out.

In this format occurring in the aforementioned Q-channel frame structure, hours, minutes and seconds showing the address within the disc are discretely recorded within the sub-code so as to conclude the 98 frames. There is also a high degree of reliability with respect to errors such as burst errors because the channel Q recorded with the hours, minutes and seconds also has the 16 bit CRC attached.

Next, an example of a disc system with an address recorded within a single frame is shown. FIG. 6 is a schematic view of one sector. As shown in the drawing, one sector is constructed from n frames, with the leading bits being taken as the sector synchronization, followed by the sector header. The sector address is recorded at this sector header. The data area to be played back and the parity area are then recorded after this sector header.

The sector header is constructed from 32 bytes laid out, for example, in the manner shown in FIG. 7. i.e. the leading 16 bits are taken as the CRC, with the following 24 bits comprising an "address" field recorded with a serial address. The most significant bits (hereinafter referred to as MSB's) of the "address" field are taken to be "address" field 1 and the least significant bits (hereinafter referred to as LSB's) are taken to be "address" field 0.

This "address" field is coded in two's compliment, with the initial sector present in the program area being taken as address "0" and the final sector present in the read-in area being taken as address "1".

Following the address field, the 32 byte header sector is constructed from a "Reserved" field, a "layer" field, a "Copyright" field, a "Track Number" field, an "Index Number" field, a "Reserved" field, a "Timecode" field, an "application code" field and an "application data" field, etc.

In a CD playback system, each type of control is carried out using the address (in hours, minutes and seconds) as a reference. For example, when there is a pause in playback, control is exerted so as to jump one track in the direction of the inner periphery every time the same address is played back. With a CD-DA and video CD, a disc address, i.e. hour, minute and second, is recorded within the Q-channel sub-code concluding the 98 frames, and because 16 bits of CRC code are attached there is good resistance to burst errors.

However, in the kind of disc system shown in FIG. 6 where a sector address is recorded so as to conclude a single frame, a high degree of reliability with regards to errors such as burst errors cannot be obtained even if a CRC is attached.

If, for example, a sector address within the sector synchronization "Sync" or the sector header is missed when data is played back in the disc system shown in FIG. 6 where a sector address is recorded within a single frame, the data becomes corrupted. Corruption in a small portion of the played back data will have little effect if audio data is recorded in the data area because the audio is muted during a pause.

However, if video data is recorded in the data area, the image outputted as a result of the image signal disappears and picture omissions occur. These picture omissions are very noticeable on the screen and make viewing difficult.

In the above, an example has been given where the sector address of an image data signal has been corrupted but data corruption with regards to other kinds of data may also hinder normal operation.

SUMMARY OF THE INVENTION

As it is the object of the present invention to provide a playback device and playback method for resolving these problems, a playback device for playing back from a recording medium data, structured in such a manner that one sector is composed of a plurality of frames and one frame is concluded by a sector address signal, comprises: a synchronization signal separator for separating sector synchronization signals from played-back data, an address signal generator for obtaining error-corrected sector address signals from played-back data and an interpolation address signal generator for generating interpolation address signals for non-error-correctable data based on the successively-obtained synchronization signals, with a prescribed playback signal being obtained using address signals obtained using the address signal generating means and/or the interpolation address signal generating means.

This playback device further comprises a synchronization signal interpolator for carrying out interpolation processing when a synchronization signal outputted from the synchronization signal separator is missed and for outputting an interpolation synchronization signal of an approximately fixed period, with an interpolation address signal being generated based on the interpolation synchronization signal.

The present invention can obtain the necessary sector addresses even when a playback signal is missed due to, for example, defects, i.e. corrupted data, by generating an interpolation address taking the sector synchronization as a reference.

In this way, picture omissions due to defects or the like may be prevented in systems using sector addresses to control signal processing.

BRIEF DESCRIPTION OF THE DRAWINGS

FIG. 4 is a view showing the frame structure of the data recording format for CD-DA's and video CD's etc.;

FIG. 5 is a schematic view showing an outline of sub-code data for a first block;

FIG. 7 is a schematic view of the layout of the sector header constructed within the first sector shown in FIG. 6.

DETAILED DESCRIPTION OF THE PREFERRED EMBODIMENT

Figure 1:
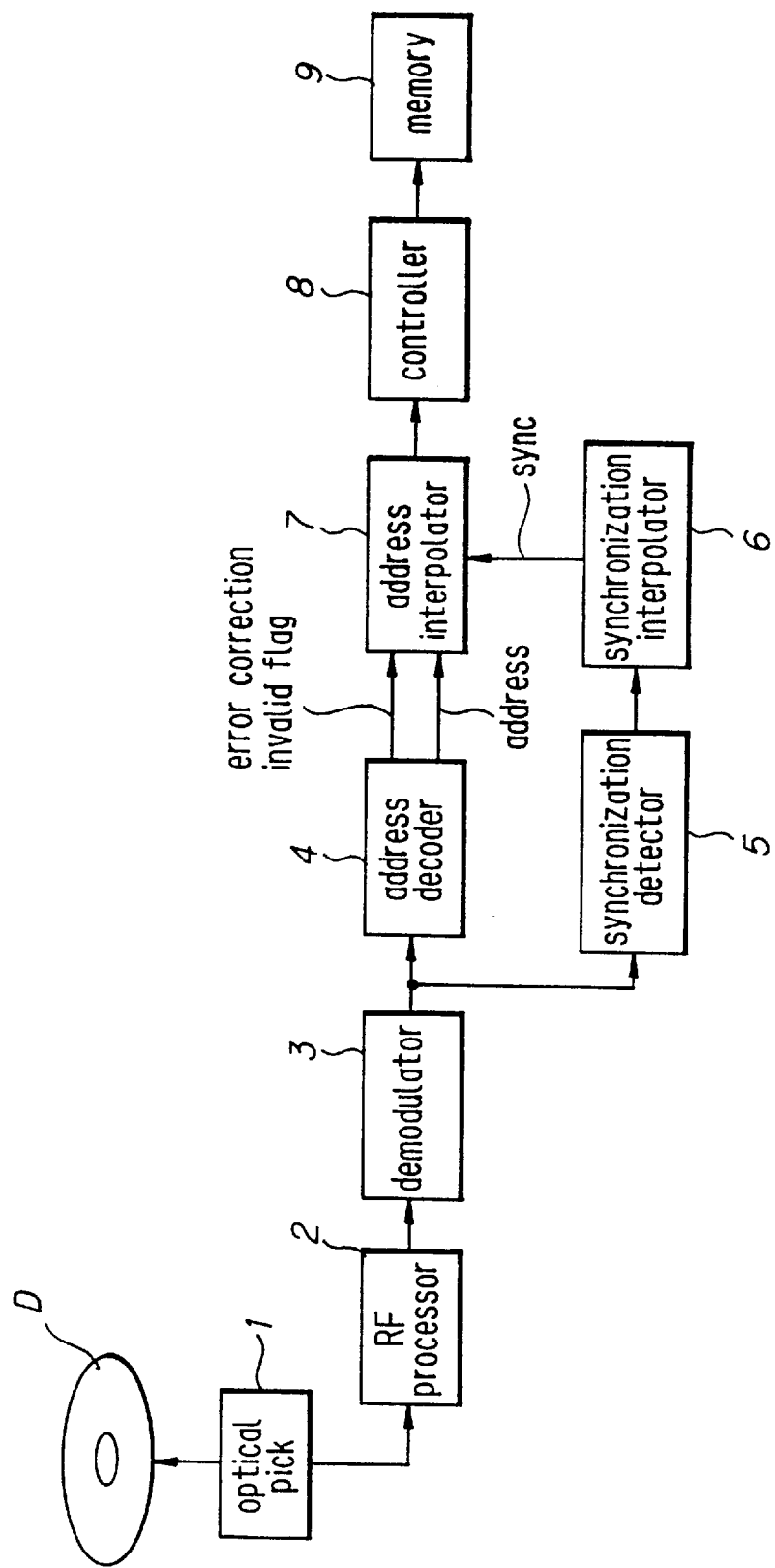
FIG. 1 is a block diagram showing the structure of an interpolation address generating device for an embodiment of the present invention.
Figure 2:
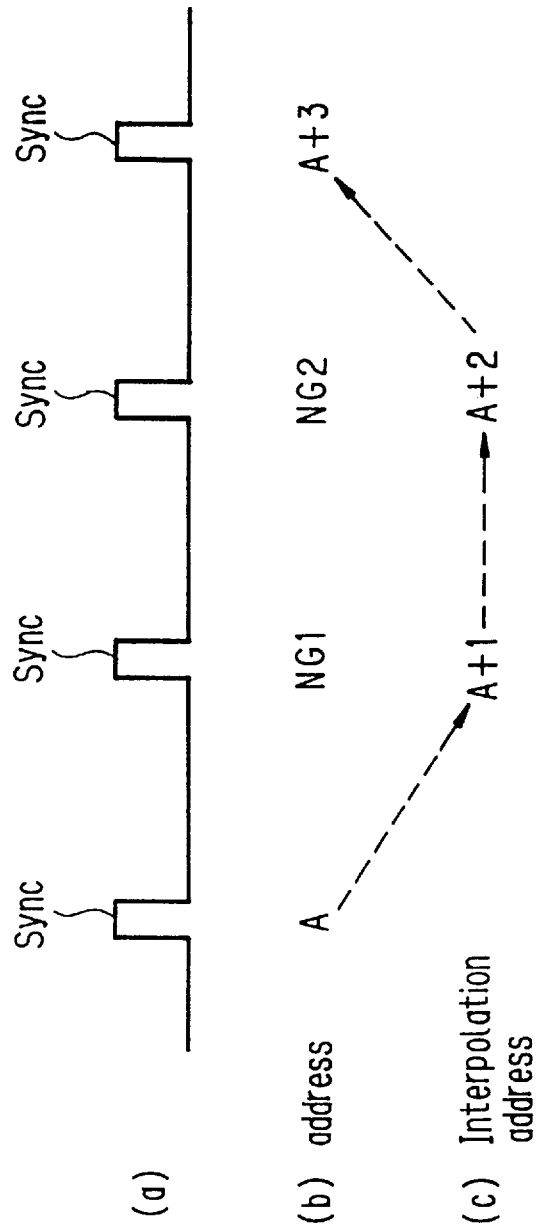
FIG. 2 is a timing flowchart showing the relationship between sector synchronization, addresses and interpolation addresses.
Figure 3:
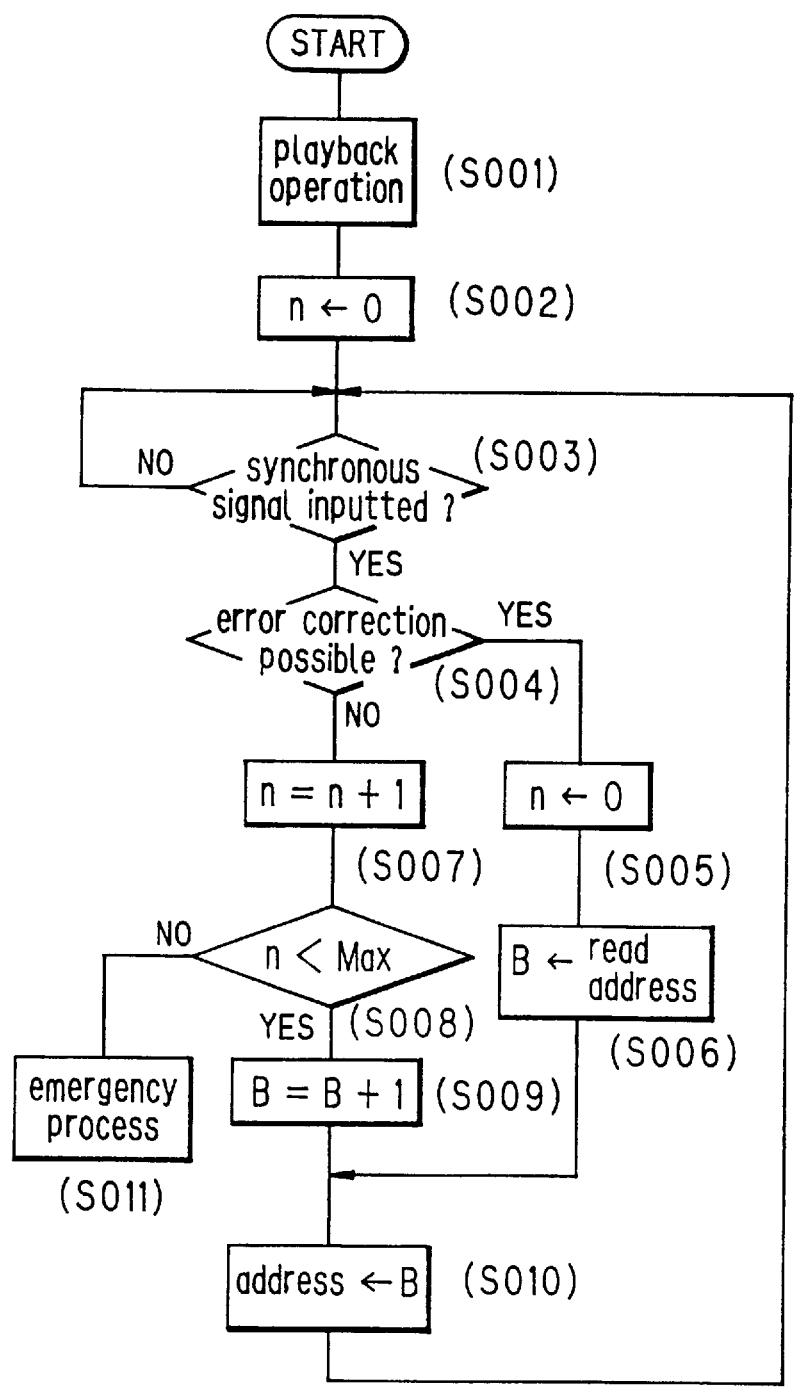
FIG. 3 is a flowchart showing the process during the generation of an interpolation address.

The following is a description of an embodiment of a playback device, a playback method, an interpolation address generating device and an interpolation address generating method for the present invention in accordance with FIGS. 1 through 3.

FIG. 1 shows an exemplary circuit block structure of the playback device and the interpolation address generating device of this embodiment.

In this drawing, D indicates an optical disc such as, for example, a digital video disc, with recorded information such as visual or audio information, rotatably driven by a spindle motor not shown in the drawings. Numeral 1 indicates an optical head that reads information by illuminating the disc D with laser light and then using a detector to detect light reflected back.

A twin-axial mechanism supporting movement of an object lens comprising the output end of the laser in the tracking and focusing directions is built into the optical head 1. This twin-axial mechanism shifts the object lens radially with respect to the disc in response to a tracking drive current being applied to a tracking coil and moves the object lens towards and away from the disc D in response to a focus drive current being applied to a focus coil.

The whole optical head 1 may also be shifted radially across the disc by a thread motor not shown in the drawings.

Numeral 2 indicates an RF signal processor for extracting an RF playback signal, a tracking error signal and a focus error signal from information read-out from the optical disc 2 via the playback operation of the optical disc 1.

Numeral 3 indicates a demodulator for EFM-demodulating and outputting, as digitally coded data, the RF playback signal, i.e. an EFM signal, extracted using the RF signal processor 2.

Data outputted and demodulated by the demodulator 3 is inputted to an address decoder 4 and a synchronous signal detector 5.

At the address decoder 4, an address for the inputted data that has been CRC checked and error corrected etc. is outputted. Error data is then inputted and an error corrected address is outputted when error correction is possible.

An error correction invalid flag is outputted when data that may not be error-corrected is inputted.

Figure 6:
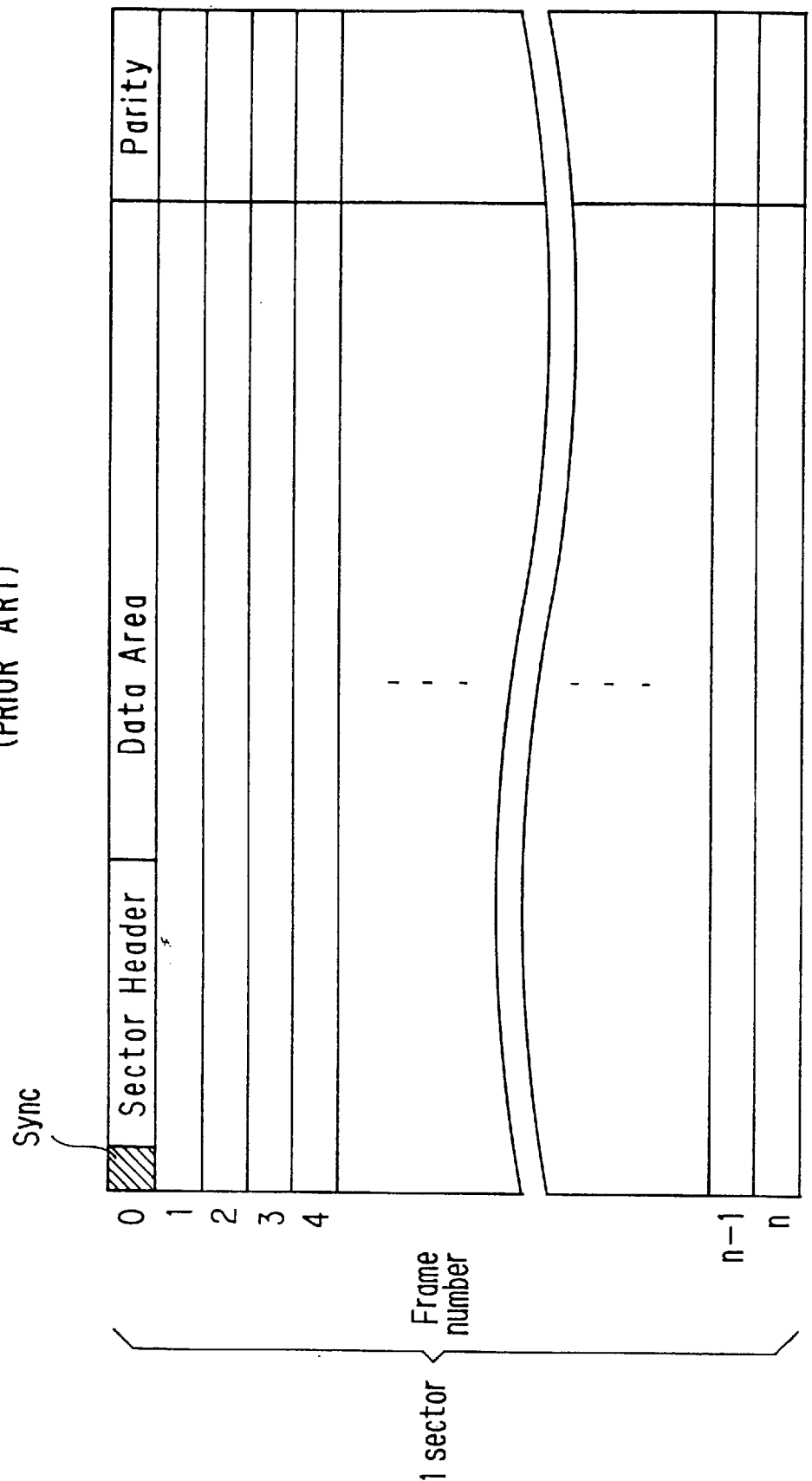
FIG. 6 is a schematic view of a first sector of a disc system with an address recorded within the first frame.

At the synchronous signal detector 5, the sector synchronization "Sync" attached to the sector header described in FIG. 6 is isolated as a data trigger. If, because of, for example, a defect, the sector synchronization "Sync" is missing, interpolation processing is carried out on the sector synchronization "Sync" at a synchronization signal interpolator 6. That is, the sector synchronization "Sync" can be obtained at a prescribed timing by the synchronization signal interpolator 6 without interruptions.

Numeral 7 indicates an address interpolator that outputs addresses inputted from the address decoder 4 without modification, and generates and outputs an interpolation address signal taking the sector synchronization "Sync" as a reference when an error correction invalid flag is inputted from the address decoder 4.

Numeral 8 indicates a controller for reading an address outputted from the address interpolator 7 or reading an interpolation address, and designating an address so that data corresponding to this address or the interpolation address may be written to a memory 9.

The aforementioned circuit block structure is suitable for equipment capable of playing back images such as, for example, "Digital Video Disk", i.e. DVD images.

FIGS. 2(a), (b) and (c) is a schematic view showing the address interpolation elements of the address interpolator 7, with FIG. 2(a) showing the timing of the sector synchronization "Sync", FIG. 2(b) showing the sector address read at the same time as the sector synchronization "Sync" and FIG. 2(c) showing the interpolation address interpolated by the address interpolator 7.

The sector synchronization "Sync" shown in FIG. 2(a) is interpolated and may therefore be obtained at a prescribed period without drop-out occurring. As shown in FIG. 2(b), in this invention interpolation addresses for portions NG1 and NG2 may be calculated from the sector address A if it is not possible to perform error correction due to inability to read the sector addresses corresponding to the two following sector synchronizations for NG1 and NG2, because it is possible to read in the sector address A as data. That is, interpolation addresses are obtained by incrementing the value of the sector address A by the number of the sector synchronization "Sync" and taking the value of the sector address for NG1 to be A+1 and the value of the sector address for NG2 to be A+2.

This is so, such that it is possible to generate the aforementioned kind of interpolation address so that the sector synchronization "Sync" is continuous when the data is continuously played back.

FIG. 3 shows the process while the interpolation address is being generated.

In the following description of the interpolation process, it is necessary to set an upper limit on the number of times the interpolation process is successively carried out because there may be reasons other than, for example, defects, as to why a sector address may not be read out. Then, if this upper limit is exceeded, the interpolation process cannot be carried out and an emergency process to be described later may be performed.

The variable B in the flowchart shown in FIG. 3 is a work area for calculating the interpolation address value, the variable n is a work area for counting the number of interpolations and "Max" is an upper limit on the number of interpolations to be carried out successively.

If the user performs a playback operation (S001), the work area n for the number of interpolations is initially stored with "0" (S002). When the sector synchronization "Sync" has then been detected for a prescribed duration and if the sector synchronization "Sync" has been detected in step S003, it is determined whether or not error correction is possible (S004).

If it is determined that error correction is possible, step S005 is entered: the work area n is reset to "0", and the read-in sector address is stored in work area B (S006). That is, the sector address A shown in FIG. 2(b) is stored. A sector address for the inputted data is then obtained by shifting the value shifted to the work area B to the buffer "address" stored with the sector address (S010).

If it is determined in step S004 that error correction is not possible, the process for incrementing the number of interpolations n is carried out (S007). If the number of interpolations n is lower than the preset value Max (S008), the work area B is incremented (S009) and stored in the buffer "address" (S010). In this way, the address A+1 following the sector address A shown in FIG. 2(b) is stored as the interpolation address.

Further, if it is determined, again in step S004, that error correction is not possible, an address A+2 following the address A+1 shown in FIG. 2(b) is calculated and stored in the buffer "address".

When the interpolation address calculation process of steps S003 to S004 and steps S007 to S010 has been carried out the prescribed number of times, i.e. when the process has been repeated to reach the upper limit "Max", the process goes from step S008 to step S011 and the emergency process is carried out. That is, if the interpolation process has been carried out more than the prescribed number of times, it is regarded that the sector address cannot be read out due to reasons other than defects, such as, for example, slipping of the servo etc. and various processes such as retries are carried out.

The upper limit "Max" depends on the capacity of the memory the data is read into but is preferably set to be, for example, 7 to 10 times.

Further, this embodiment has been constructed from hardware but may also be constructed from arithmetic processing devices such as central processing units or digital signal processors, etc.

The address interpolation device and address interpolation method of the present invention described above can achieve single track jumps regardless of defects etc. even during pauses and can maintain a paused state because an address can be obtained by taking the synchronization signal as a reference even when a portion of the playback signal is damaged as a result of, for example, defects.

Therefore, in systems controlling signal processing operations using sector addresses, picture loss in particular due to defects during playback of the image signal can be prevented, and the public may not be disturbed during pauses in playback.

What is claimed is:

1. Apparatus for retrieving information from a recording medium, comprising:

an optical head for optically illuminating said recording medium having information recorded in a plurality of sectors divided into a plurality of frames with a sector address included in a frame, said optical head converting illumination reflected from said recording medium into an information carrying data signal including a sector address signal;

a synchronization detector for separating a sector synchronization signal from said information carrying data signal;

an address decoder for generating an error-free sector address signal if said sector address signal is either error-free or contains a correctable error, said address decoder generating a flag indicating whether said sector address signal contains an uncorrectable error;

an address interpolator for incrementing a previously received error-free sector address signal when said sector synchronization signal is received to generate an interpolation address signal in response to said flag indicating that an error in said sector address signal is not correctable, said address interpolator counting interpolation address signals generated consecutively, wherein a next interpolation address signal is not generated if the number of the consecutively generated interpolation address signals is not less than a predetermined threshold value representing a maximum number of the consecutively generated interpolation address signals; and a memory for storing a sector address based on either said error-free sector address signal or said interpolation address signal in correspondence with information recorded on the sector identified by said sector address.

2. The device according to claim 1 further comprising means for generating an interpolation synchronization signal of a substantially fixed period if said sector synchronization signal is not received, wherein said interpolation address signal is generated when said interpolation synchronization signal is generated.

3. The device according to claim 1 further comprising means for carrying out an emergency processing if said predetermined threshold value is exceeded.

4. A method of retrieving information from a recording medium in a device that includes an address decoder, comprising:

optically illuminating said recording medium having information recorded in a plurality of sectors divided into a plurality of frames with a sector address included in a frame;

converting illumination reflected from said recording medium into an information carrying data signal including a sector address signal;

separating a sector synchronization signal from said information carrying data signal;

generating by said address decoder an error-free sector address signal if said sector address signal is either error-free or contains a correctable error, and further generating by said address decoder a flag indicating whether said sector address signal contains an uncorrectable error;

incrementing a previously received error-free sector address signal when said sector synchronization signal is received to generate an interpolation address signal in response to said flag indicating that an error in said sector address signal is not correctable, counting interpolation address signals generated consecutively, wherein a next interpolation address signal is not generated if the number of the consecutively generated interpolation address signals is not less than a predetermined threshold value representing a maximum number of the consecutively generated interpolation address signals; and storing a sector address based on either said error-free sector address signal or said interpolation address signal in correspondence with information recorded on the sector identified by said sector address.

5. The method according to claim 4 further comprising the step of generating an interpolation synchronization signal of a substantially fixed period if said sector synchronization signal is not received, wherein said interpolation address signal is generated when said interpolation synchronization signal is generated.

6. The method according to claim 4 further comprising the step of carrying out an emergency processing if said predetermined threshold value is exceeded.

* * * * *